US011049621B2

(12) United States Patent
Wong

(10) Patent No.: US 11,049,621 B2
(45) Date of Patent: Jun. 29, 2021

(54) SUBMICRON FUSION DEVICES, METHODS AND SYSTEMS

(71) Applicant: Alpha Ring International, Ltd., Grand Cayman (KY)

(72) Inventor: Alfred Y. Wong, Los Angeles, CA (US)

(*) Notice: Subject to any disclaimer, the term of this patent is extended or adjusted under 35 U.S.C. 154(b) by 0 days.

(21) Appl. No.: 16/571,293

(22) Filed: Sep. 16, 2019

(65) Prior Publication Data

US 2020/0051700 A1 Feb. 13, 2020

Related U.S. Application Data

(63) Continuation of application No. 14/742,546, filed on Jun. 17, 2015, now Pat. No. 10,453,575.

(60) Provisional application No. 62/013,459, filed on Jun. 17, 2014.

(51) Int. Cl.
*G21B 3/00* (2006.01)

(52) U.S. Cl.
CPC ..................... *G21B 3/00* (2013.01)

(58) Field of Classification Search
USPC ........................................................ 376/100
See application file for complete search history.

(56) References Cited

U.S. PATENT DOCUMENTS

| 3,014,857 A | 12/1961 | Gow et al. |
|---|---|---|
| 3,859,164 A | 1/1975 | Nowak |
| 4,767,590 A | 8/1988 | Stix et al. |
| 6,891,911 B2 | 5/2005 | Rostoker et al. |
| 9,224,505 B2 | 12/2015 | Wong |
| 9,245,654 B2 | 1/2016 | Wong |
| 10,453,575 B1 | 10/2019 | Wong |
| 2003/0223528 A1 | 12/2003 | Miley |
| 2005/0129160 A1 | 6/2005 | Indech |
| 2006/0198485 A1 | 9/2006 | Binderbauer |
| 2008/0187086 A1 | 8/2008 | Bussard |
| 2009/0122940 A1 | 5/2009 | Breed |
| 2010/0294666 A1 | 11/2010 | Wong |
| 2010/0303188 A1* | 12/2010 | Lawandy ............ G21B 3/00 376/107 |
| 2011/0013738 A1 | 1/2011 | Kotschenreuther et al. |
| 2011/0085632 A1 | 4/2011 | Klein et al. |
| 2011/0142185 A1 | 6/2011 | Woodruff |
| 2011/0188623 A1 | 8/2011 | Wong |

OTHER PUBLICATIONS

Examinar's Appendix: Low Energy Nuclear Reactions.*
U.S. Notice of Allowance dated Jun. 10, 2019 in U.S. Appl. No. 14/742,546.

(Continued)

*Primary Examiner* — Marshall P O'Connor
(74) *Attorney, Agent, or Firm* — Potomac Law Group, PLLC; Vincent M DeLuca

(57) ABSTRACT

Methods, apparatus, devices, and systems for creating, controlling, conducting, and optimizing fusion activities of nuclei. In particular, the present inventions relate to, 5 among other things, fusion activities that are conducted individually or collectively on a very small scale, preferably on the nano-scale or smaller such as pico to femto scales, for the utilization of energy produced from these activities in smaller devices and for aggregation into larger devices.

35 Claims, 10 Drawing Sheets

100 electrode 101 tapper 102 tip point 103 electron movement 104 area of high electron density 110 basic structure

(56) References Cited

OTHER PUBLICATIONS

U.S. Office Action dated Feb. 26, 2019 in U.S. Appl. No. 14/742,546.
U.S. Final Office Action dated Jul. 24, 2018 in U.S. Appl. No. 14/742,546.
U.S. Final Office Action dated May 2, 2017 in U.S. Appl. No. 14/742,546.
U.S. Final Office Action dated Oct. 12, 2016 in U.S. Appl. No. 14/742,546.
U.S. Office Action NFOA dated Mar. 16, 2016 in U.S. Appl. No. 14/742,546.
Alvarez et al., "Catalysis of Nuclear Reactions by ∥ Mesons," Letters to the Editor, Physical Review, 1957, p. 1127.
Jackson, Catalysis of Nuclear Reactions between Hydrogen Isotopes by μ-Mesons, Physical Review, vol. 106, No. 2, Apr. 1957, pp. 330 - 339.
Bencze et al., "Couloumb Screening in Low-Energy Nuclear Reactions," Physical Review C, vol. 45, No. 2, The American Physical Society, Feb. 1992, pp. 532-539.
Slides, "Coulomb Barrier for Nuclear Fusion," presented by Applicant to USPTO on Oct. 5, 2017.
Slides, "Alpha Halflife vs. Kinetic Energy," presented by Applicant to USPTO on Oct. 5, 2017.
Excerpt from Introduction to Electrostatics, Classical Electrodynamics, pp. 8 9, presented by Applicant to USPTO on Oct. 5, 2017.
Slides, "Rutherford Scattering with Electric Field," presented by Applicant to USPTO on Oct. 5, 2017.
Hagelstein et al., "New Physical Effects in Metal Deuterides," pp. 1-30.
Czerski et al., Experimental and theoretical screening energies for the 2H(d,p)3H reaction in metallic environments,' Eur. Phys. J_ A 27, 2006.
Raiola et al., "Electron screening in d(d,p)t for deuterated metals and the periodic table," Physics Letters B 547(2002), pp. 193-199.
Technology Forecast: Worldwide Research on Low-Energy Nuclear Reactions Increasing and Gaining Acceptance, Defense Analysis Report DIA-08-0911-003, Nov. 2009.
Resume of Dr. Chun-Ching Shih presented by Applicant to USPTO on Oct. 5, 2017.
Opinion Letter of Dr. Chun-Ching Shih presented by Applicant to USPTO on Oct. 5, 2017.
Ed Moses {physicist} Wikipedia Entry retrieved Oct. 1, 2017, presented by Applicant to USPTO on Oct. 5, 2017.
Opinion Letter of Dr. Moses presented by Applicant to USPTO on Oct. 5, 2017.
Letter of Prof. Mark A. Cappelli presented by Applicant to USPTO on Oct. 5, 2017.
U.S. Appl. No. 16/557,491, filed Aug. 30, 2019, Wong.

* cited by examiner 100 electrode 101 tapper 102 tip point 103 electron movement 104 area of high electron density 110 basic structure (a)The scheme of palladium-gold-palladium 3 layers structures with periodically arranged holes on it (b) Cross-sectional view through the center of the hole. We used following parameters set $d$= 30nmd, $w$= 15nmw, D= 100nm.

SUBMICRON FUSION DEVICES, METHODS AND SYSTEMS

PRIORITY DATA

An Application Data Sheet is filed concurrently with this specification as part of the present application. Each application that the present application claims benefit of or priority to as identified in the concurrently filed Application Data Sheet is incorporated by reference herein in its entirety and for all purposes.

BACKGROUND OF THE INVENTION

Field of the Invention

The present inventions relate to methods, apparatuses, devices, and systems for creating, controlling, conducting, and optimizing fusion activities of nuclei. In particular, the present inventions relate to, among other things, fusion activities that are conducted individually or collectively on a very small scale, preferably on the nano-scale or smaller such as pico to femto scales, for the utilization of energy produced from these activities in smaller devices and for aggregation into larger devices.

Controlled fusion devices, methods and systems are taught and disclosed in US Patent Application Publication Nos. 2010/0294666, 2011/0188623, U.S. patent application Ser. Nos. 13/663,751, 14/205,337, 13/952,826, 61/925,114, 61/925,131, 61/925,122, 61/925,148, 61/925,142, 61/210,383, and 61/843,015 the entire disclosures of each of which are incorporated herein by reference.

As used herein, unless expressly stated otherwise, the term fusion should be given its broadest possible meaning, and would include interactions between two or more nuclei whereby one or more new or different nuclei are formed, as well as subsequently induced or derivative reactions and energy generation associated therewith.

As used herein, unless expressly stated otherwise, the terms formation, formation of material, and similar terms should be given their broadest possible meaning, and would include transmutation, and the modification or creation of a nucleus or nuclei, such as, for example, nuclides, and isotopes having value in medical, imaging, testing, and other useful applications.

As used herein, unless expressly stated otherwise, the term light element means an element or ion with atomic mass of 62 or less.

As used herein, unless expressly stated otherwise, the term physical confinement, physical containment, and similar such terms mean the use of a physical structure that passively confines the fusion reaction as opposed to the use of directed energy, including shockwaves, EM fields such as from lasers, or electromagnetic fields to confine the fusion interaction.

As used herein, unless expressly stated otherwise, the term strongly ionized plasma means a plasma whereby the ratio of ions to neutrals is at least about 1:1. As used herein, unless expressly stated otherwise, the term weakly ionized plasma means a plasma whereby the ratio of ions to neutrals is less than about 1:100. The terms plasma, ionized material, and similar such terms includes all degrees and ratios of ionization.

As used herein, unless expressly stated otherwise, the term neutrals means atoms, molecules or clusters with no net charge.

As used herein, unless expressly stated otherwise, the terms fusion fuel, reactants, fusion reactions and similar terms are to be given their broadest possible means and would include hydrogen-1, boron-11, lithium-6, lithium-7, deuterium, tritium, helium-3, nitrogen-15, and any other elements, materials and compounds, including isotopes, that may be identified to be useful fusion fuels, and combinations and variations of the foregoing.

Discussion of the State of the Art

For 60 years the science and technology communities have been striving to achieve controlled and economically viable fusion. The commonly held belief in the art is that another 25-50 years of research remain before fusion is a viable option for power generation-"As the old joke has it, fusion is the power of the future—and always will be" ("Next ITERation?", Sep. 3, 2011, *The Economist*). Further, until the present inventions, it was believed that a paradigm existed in that achieving fusion of reactants was unobtainable without incredibly high temperatures for even the most likely reactants and even higher temperatures for other reactants. As a consequence, it was further believed that there was no reason to construct, or investigate the composition of, a nuclear fusion reactor with lower temperature reactant confinement.

Prior to the present inventions it was believed that the art in controlled fusion reactions taught that temperatures in excess of 150,000,000 degrees Centigrade were required to achieve favorable gross energy balance in a controlled fusion reactor. Gross energy balance, Q, is defined as:

$$Q = \frac{E_{fusion}}{E_{in}}, \qquad \text{a.}$$

where $E_{fusion}$ is the total energy released by fusion reactions and $E_{in}$ is the energy used to create the reactions. The Joint European Torus, JET, claims to have achieved Q≈0.7 and the US National Ignition Facility recently claims to have achieved a Q>1 (ignoring the very substantial energy losses of its lasers). The condition of Q=1, referred to as "breakeven," indicates that the amount of energy released by fusion reactions is equal to the amount of energy input. In practice, a reactor used to produce electricity should exhibit a Q value significantly greater than 1 to be commercially viable, since only a portion of the fusion energy can be converted to a useful form. Conventional thinking holds that only strongly ionized plasmas, are necessary to achieve Q>1. These conditions limit the particle densities and energy confinement times that can be achieved in a fusion reactor. Thus, the art has looked to the Lawson criterion as the benchmark for controlled fusion reactions—a benchmark, it is believed, that no one has yet achieved when accounting for all energy inputs. The art's pursuit of the Lawson criterion, or substantially similar paradigms, has led to fusion devices and systems that are large, complex, difficult to manage, expensive, and economically unviable.

A common formulation of the Lawson criterion is as follows:

$$N_{\tau_{E^*}} > \frac{3(1 - \eta_{in}\eta_{out})H}{\eta_{in}\eta_{out}\frac{\langle\sigma v\rangle_{ab}(H)Q_{ab}}{4(1+\delta_{ab})} - (1-\eta_{in}\eta_{out})A_{br}\sqrt{H}}$$

All of the parameters that go into the Lawson criterion will not be discussed here. But in essence, the criterion requires that the product of the particle density (N) and the energy confinement time ($\tau_E^*$) be greater than a number dependent on, among other parameters, reaction temperature (H) and the reactivity $\langle \sigma v \rangle_{ab}$, which is the average of the product of the reaction cross section and relative velocity of the reactants. In practice, this industry-standard paradigm suggests that temperatures in excess of 150,000,000 degrees Centigrade are required to achieve positive energy balance using a D-T fusion reaction. For proton-boron fusion, as one example, the criterion suggests that the product of density and confinement time must be yet substantially higher.

It should be noted that current fusion schemes using D-T fuels, which produce radioactive materials, should have shielding and take steps and precautions, such as the use of robotic operating systems to maintain safety.

An aspect of the Lawson criterion is based on the premise that thermal energy must be continually added to the plasma to replace lost energy to maintain the plasma temperature and to keep it fully or highly ionized. In particular, a major source of energy loss in conventional fusion systems is radiation due to electron bremsstrahlung and cyclotron motion as mobile electrons interact with ions in the hot plasma. The Lawson criterion was not formulated for fusion methods that essentially eliminate electron radiation loss considerations by avoiding the use of hot, heavily ionized plasmas with highly mobile electrons.

Because the conventional thinking holds that high temperatures and strongly ionized plasma are required, it was further believed in the art that inexpensive physical containment of the reaction was impossible. Accordingly, methods being pursued in the art are directed to complex and expensive schemes to contain the reaction, such as those used in magnetic confinement systems (e.g., the ITER tokamak) and in inertial confinement systems (e.g., NIF laser).

In fact, at least one source in the prior art expressly acknowledges the believed impossibility of containing a fusion reaction with a physical structure: "The simplest and most obvious method with which to provide confinement of a plasma is by a direct-contact with material walls, but is impossible for two fundamental reasons: the wall would cool the plasma and most wall materials would melt. We recall that the fusion plasma here requires a temperature of $\sim 10^8$ K while metals generally melt at a temperature below 5000 K." ("Principles of Fusion Energy," A. A. Harms et. al.)

SUMMARY

The present inventions break the prior art paradigms by, among other things, increasing the reactant density, essentially eliminating electron radiation losses, and combinations of these, by avoiding the use of a strongly ionized plasma, modifying the Coulomb barrier and thus increasing the reaction cross section, and essentially eliminating the need for confinement to contain the fusion reaction. Such approaches make Lawson's criterion inapposite.

The importance and value of achieving economically viable controlled fusion has long been recognized and sought after in the art. Controlled fusion may have applications in energy production, propulsion, material creation, material formation, the production of useful isotopes, generation of directed energetic beams and particles, and many other key fields and applications. In the energy production area, controlled fusion has been envisioned to provide a solution to global energy and environmental challenges, including supply, distribution, cost, and adverse effects from using hydrocarbon or other alternative fuel sources. Accordingly, there has been a long-standing and unfulfilled need for a controlled fusion reaction, and the clean energy and other benefits and beneficial uses that are associated with such a reaction. This need, however, has primarily focused on using controlled fusion for larger, or macro applications, such as providing power to a city, factory or building.

There has further been a long-standing need for reliable and dependable small power sources for use in small devices such as cell phones, robotics, hearing aids, pace makers, laptop computers, smart phones, hand held electronic devices and the like, as well as for newer, smaller, and emerging technologies, such as, nano-technologies, micro-circuits, nano-circuits and micro-robotics. While battery technologies and other power sources have been rapidly evolving and becoming smaller, and smaller, in many instances they have failed to keep up with the needs of smaller and smaller devices, and the need for having power supplies that do not readily become depleted. Unfortunately, in many cases, battery technology may be becoming the limiting factor to the further advancement of these small electronic technologies.

The present methods, devices and systems for conducting fusion reactions solve these and other problems, deficiencies, and inadequacies associated with prior attempts to create a viable controlled fusion system, and short comings in conventional small, micro-, nano-, and sub-nano-electronic devices. Further, the present inventions avoid the risks associated with conventional fission power generation. Moreover, available aneutronic embodiments of controlled fusion avoid the potential issues associated with managing neutrons produced in other fusion reactions, and make devices utilizing these embodiments readily usable in devices that are closely associated with living entities, e.g., a pace maker. Thus, the present inventions, among other things, solve these needs by providing the articles of manufacture, devices and processes taught, disclosed and claimed herein.

Thus, there are provided the methods, systems, articles and devices of the present specification, drawings and claims.

DESCRIPTION OF THE PREFERRED EMBODIMENTS

Figure 1:
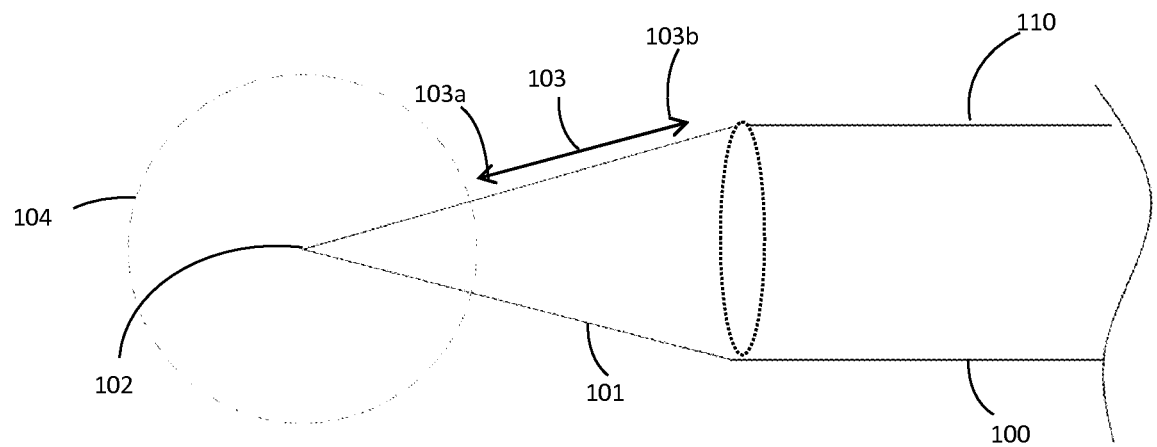
FIG. 1 is a perspective view of an embodiment of a controlled fusion device in accordance with the present inventions.

In general, the present inventions relate to methods, apparatuses, devices, and systems for creating, measuring, controlling, conducting, and optimizing fusion activities of nuclei. In particular, the present inventions relate to, among other things, fusion activities that are conducted individually on a very small scale; and for the utilization of the energy, materials, and particles that are produced from these small-scale fusion activities. The present inventions further related to, among other things, small devices for causing and controlling these small fusion activities, and utilizing the products of these fusion activities, as well as, the aggregation of these smaller devices and the utilization of the aggregation.

Generally, the present methods, apparatuses, and systems utilize the creation of submicron regions, and preferably nano regions (e.g., about one cubic nanometer, $nm^3$, $10^{-27}$ $m^3$), or smaller, of high charge densities to provide for controlled fusion reactions, and preferably with simple containment schemes (without the need for any complicated containment schemes), and more preferably without the need for any magnetic fields. Further, embodiments of the present inventions create or modify quantum and other effects to provide for, or enhance, the fusion reaction.

In general, embodiments of the controlled fusion devices cause electrons to form an area of high charge density associated within a base structure containing the reactants. In an embodiment the base structure has, is, or forms a lattice, mesh, cage, pores, other substructures, and combinations and variations of these. The base structure, and preferably the substructure, holds, carries, encapsulates, encompasses, replenishes, exposes, contains, supports, maintains and combinations and variations of these reactants. The high charge density associated with the base structure can be provided by causing the electrons to move in a manner that results in their collection, agglomerating, coming together, increasing density and combinations and variation of these.

Embodiments of the base structure material include, for example palladium, tungsten, boron hydride, titanium, tantalum, getter materials for hydrogen and low molecular weight gasses, and other materials that can support or carry the fusion fuel. The base structure may be a composite material, an alloy, a metal-ceramic, it may contain layers, the layers may be of the same or different materials, the layers may have the same or different substructures, initially underlying layers may over time become exposed to the reaction as the device operates, and combinations and variations of these and other configurations. Coatings may be used on the surface of the base structure, for example, gold, copper, silver or other conducting materials, and preferably materials having good conductivity, and having low resistance.

Embodiments of the base structure have a discontinuity. This discontinuity can be an area of discontinuity, or more preferably one or more points of discontinuity (It being understood that the point(s) may still have some area, but as used herein the point(s) of discontinuity generally refers to a generally circular shape, generally square shape, generally rectangular shape, generally elliptical shape or other shape having an area of about 1 $\mu m^2$ or less, about 500 $nm^2$ or less, about 100 $nm^2$ or less, 50 $nm^2$ or less and preferably about 10 $nm^2$ or less). Generally, this discontinuity is associated with, preferably adjacent, and more preferably central to the area of high electron charge density. The discontinuity may be a knife edge, it may be an annular knife edge, and preferably it may be the tip, e.g., point, of a tapered member, such as a solid or tubular nano-needle. The base structure may contain one, two or more discontinuities. When multiple discontinuities are present they may be the same or different, for example, in terms of shape configuration, intended reactants or other attributes.

The fusion fuel may be any of the materials identified in this specification, as suitable for a fusion reaction or known to be useful in such a reaction, or later discovered to be useful, that can be loaded or otherwise incorporated into, or held by, the base structure, and more preferably the substructure of the base structure. Preferably, the fusion fuel is, for example hydrogen, deuterium, Boron-11, Helium-3, and mixtures of these. The fusion fuel is loaded or reloaded into the base structure. Preferably, the fusion fuel is loaded or reloaded into the discontinuity, and most preferably is load into the area where the high electron density will be present. Thus, in a preferred embodiment the fusion fuel is heavily loaded into the volume of the base structure that is in the area of the discontinuity and the area of high electron density, with the fusion fuel being held by the substructure.

It addition to the fusion fuel being preloaded into the base structure, the fusion fuel can be added continuously, batch wise, generated in situ during the fusion reaction (e.g., generation of $^3He$), between operations and combinations and variations of these. Thus, for example, a palladium tubular nano-needle base structure, having a closed tip to a needle point, can have its inner space filled with excess hydrogen (or in fluid communication with a source of hydrogen) so that as the hydrogen is depleted during operation the excess hydrogen will migrate, e.g., getter, into the base structure and thus re-load the structure with fusion fuel.

In an embodiment, the device can be operated without reloading or replenishing of the fusion fuel in the base structure. The device could be created with many base structures, only some of which operate at any given time, wherein the additional base structures would be activated when the fusion fuel is fully or partially depleted from the base structures that had previously been activated. Such an device would include a monitoring and control mechanism to successively turn off and on base structures in a desired manner.

The volume of fusion fuel, e.g., hydrogen to the volume of base structure material, e.g., palladium, can be significantly larger, providing advantages to the fusion reaction. The volume of fusion fuel can be 2× larger or more than the volume of base structure material, it can be 3× larger or more, it can be 5× larger or more, and it can be 7× larger or more, depending upon, among other things, the particular fusion fuel(s) used, base material used, and substructure present. For hydrogen fuel, palladium base structure embodiments, the hydrogen can be loaded to 8× the volume of the palladium.

Preferably, the fusion fuel can be loaded or reloaded into the base structure to particle densities of $10^{15}$/cc or more, $10^{18}$/cc or more, $10^{20}$/cc or more, $10^{22}$/cc or more, and more preferably about $10^{23}$/cc. It being noted that the fusion fuel densities of the present inventions are substantially greater than the densities obtained in the larger magnetic containment fusion devices, such as the Tokamak reactors (reported to be limited to particle densities of $10^{14}$/cc).

The fusion fuel can be loaded or reloaded into the base structure by gettering, provided that the base structure-fusion fuel type exhibit this effect. The fusion fuel can be loaded or reloaded by any means or technique known to the art, or later developed, to incorporate or include smaller atomic scale particles into a larger matrix or supporting structure. The fusion fuel itself, may also be the base structure.

The region of high electron density can be provided by using a microwave generator, radio frequency (RF) wave generator, or similar device, associated with the base structure. In operation, the high electron density generator causes the electrons to move in a first direction along generally the surface of the base structure toward the discontinuity (forward electron flow), and then quickly reverses the flow of the electrons away from the discontinuity (reverse electron flow). In this manner the forward and reverse electron flows along generally the surface of the substructure creates a high electron density at the discontinuity. The base structure can be coated with a material to enhance or facilitate this flow of electrons along its surface, such as a gold coating, copper coating, silver coating or a coating of other conducting materials, and preferably materials having good conductivity, and having low resistance. This area of high electron density is present, e.g., exists, at its peak periodically. Typically the periodicity of the high electron density peak is at about the same frequency as that of the high electron density generator; although there may be doubling, and other effects that result in a differences between the two. For example the generator may operate at a wavelength of from about 10 microns to about 0.1 micron. The generator can also operate at wavelengths of x ray and gamma ray to reach higher electron densities. The power for these generators is minimal, requiring about 1 mW to about 10 mW, and generally less than about 1 mW per discontinuity.

A laser may also be directed on the discontinuity and establish a similar forward and reverse flow of electrons to establish an area of high electron density peaks. Laser wavelengths of from about_10 microns_ to about_0.1 micron_, The laser power for the laser beam can be from about_1_nW to_1_mW, about_1_mW to about_10_mW and generally less than about_1_mW. The base structure can be coated with, or made from a material, that is selected to optimize the laser material interaction and more preferably to optimize both the laser material interaction and the flow of electrons.

In addition to the laser, microwave generator and RF generator, other manners of, devices for, generating the region of high density electrons can be used, for example magnetrons with cavities which can bundle electrons together to high densities or nonlinear effects in an electron-beam plasma where the electron wave can collapse three dimensionally to very small locations with high electron densities.

The region of high density electrons, in particular embodiments, can have particle densities of $10^{15}$/cc or more, $10^{18}$/cc or more, $10^{20}$/cc or more, $10^{22}$/cc or more, and about $10^{23}$/cc or more. The electric field for these regions can be greater than about $10^8$ V/m (volts/meter), greater than about $10^9$ V/m, greater than about $10^{10}$ V/m and greater than about $10^{11}$ V/m.

The fusion fuel material may be, for example, hydrogen-1, boron-11, lithium-6, lithium-7, deuterium, helium-3, nitrogen-15, tritium. It may be advantageous to use molecular compounds that are good electron emitters, for example boron nitride or lanthanum hexaboride or cerium hexaboride and combinations and variations of these and other types of materials.

It should be understood that the figures in this specification are generally representative of very small components (e.g., micron, nano, and pico sizes). Thus, the figures are not to scale, and are illustrative of the relationships, structures and components of the various embodiments, and should be viewed as part of, and in the context of, the entirety of the teachings of this specification.

Turning to FIG. 1 there is shown a perspective view of a section of an embodiment of a base structure 110 for use in an embodiment of a fusion device of the present invention. The base structure 110 is a tubular electrode 100, which has a tapering section 101, to form a tip 102, e.g., a point, which is a discontinuity. When a high-density electron generator (not shown) is applied to the electrode 100, electron movement as shown by double arrow 103 occurs. With the arrow 103a toward the tip 102 being the forward electron movement and the arrow 103b toward the tubular section being the reverse electron movement. The area of high electron density is shown as 102 and the high electric field region is 104. Although it is presently believed that this is primarily a surface effect, the scope of protection to the present inventions should not be so limited.

The movement of the electrons is preferably collective, coherent, and both. Thus, it is theorized that this collective and coherent motion of electrons is similar to, and may be, the type of electron movement exhibited in superconductive materials. This collective and coherent electron motion, of the present inventions, takes place at room and elevated temperatures. Thus, the present invention provides for ambient temperature and above superconductivity, and superconductivity like behaviors in the movement of electrons.

Figure 1A:
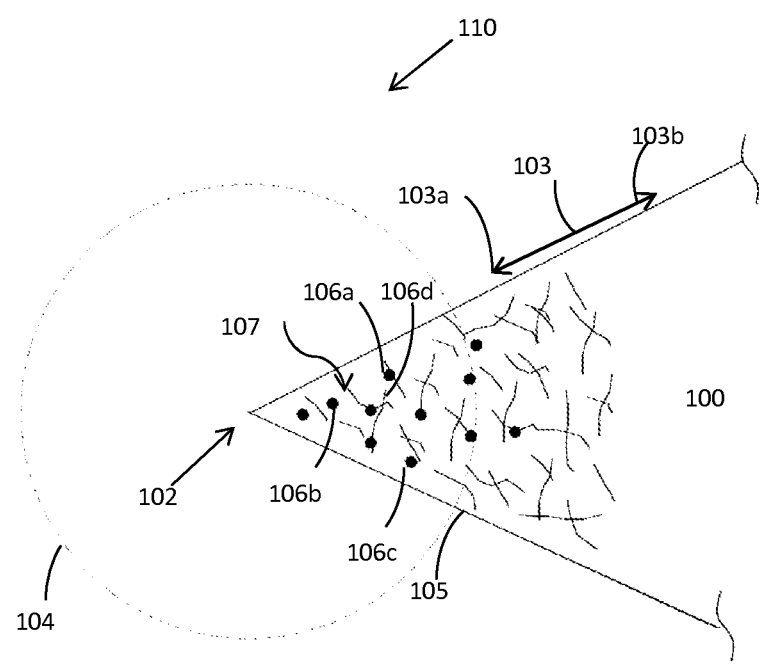
FIG. 1A is an enlarged cross sectional view of a portion of the embodiment of FIG. 1.

Turning to FIG. 1A there is shown a cross sectional schematic view of the tip 102 and tapering section 101 of electrode 100. The substructure 105 of the base structure 110, has fusion fuel materials, e.g., 106a, 106b, 106c, 106d.

In operation it is believed that the creation of the area of high electron density enables, facilitates, or furthers the fusion reaction of the fusion fuel. It is theorized that among other things, the presence of the high electron density lowers the coulomb barrier, and preferably creates a negative well, that permits the fusion fuel, e.g., 106b, 106c, to fuse. Further, it is theorized that the highly localized electron density, creates a ponderomotive force that drives the fusion fuel together, and also drives the electrons into the substructure of the base material, enhancing the fusion reaction of the fusion fuel.

Figure 7:
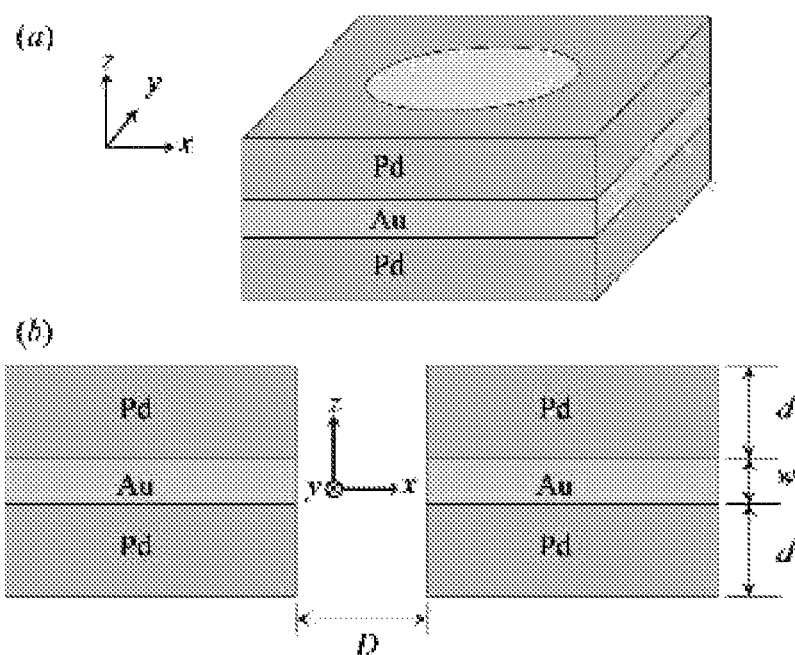
FIG. 7 shows a three layer base structure in accordance with an example embodiment.

In one of the embodiments of the present invention, as shown in FIG. 7, there is a three layer structure that will produce large electric field enhancement. The geometry of generalized discontinuity is shown in FIG. 7. By using a femtosecond laser, the local surface plasmon (LSP) is excited. By optimizing parameters, a large field enhancement at resonant frequency was observed. Calculation result shows that near the Pd layer, the field enhancement induced high electric potential which have the same magnitude of coulomb barrier between two deuterium nucleis, which means it can overcome the coulomb repulsion and extremely enhance the probability of fusion reaction.

In another embodiment, the excitation source, e.g. laser, diode laser, or RF/microwave generator, is integrated in or near the base structure of the device to optimizing coupling of radiation and miniaturization of the device.

The submicron controlled fusion device can be associated with a device for generating electricity. The devices would include, for example, sensor chips that have been adapted to generate a current, voltage or both in response to the heat generated by the fusion reaction, in response to the charged fusion product particles generated by the fusion reaction and both. Thus, as examples, (A) a radiation detection type diode can be adapted to produce electricity from the fusion products, (B) a thermoelectric device could convert a portion of the heat energy into electric current, (C) a fluid could be forced to flow, expand or incur a phase change so as create some electricity or other useful energy. The devices for generating electricity from the controlled fusion reaction could also include (D) mechanisms to slow the resulting charged particles by an electromagnetic field so as to effect a direct conversion to electricity and (E) mechanisms to put small electrodes adjacent to the discontinuity so as to have charged particles collide with one or the other of the electrodes and thereby induce a current or to recharge a connected battery or capacitor. The foregoing means could include combinations of the foregoing. For example, if the means of direct conversion to electricity was only partially efficient, it could be deployed in combination with a thermoelectric device to create electricity from the heat remaining after deployment of the direct conversion mechanism.

Although not required, the electrodes of the device could also be located in, or have a source of fusion fuel around their exterior, such as being contained in a closed microvessel, filled with, or having hydrogen flowed through it.

Generally, the term "about" is meant to encompass a variance or range of ±10%, the experimental or instrument error associated with obtaining the stated value, and preferably the larger of these.

Embodiments of the present inventions may utilize quantum, electrostatic, mechanical, or other effects including, among other things, large E-fields, high electron densities, ponderomotive forces, modification or change of the Coulomb barrier, modification or change of the reaction cross section, space charge or electron shielding effects, the use of neutrals, ion-neutral coupling, nuclear magnetic moment interaction, spin polarization, magnetic dipole-dipole interaction, high particle density materials, compression forces associated with centrifugal forces or ponderomotive forces, phase transitions of hydrogen, positive feedback mechanisms, and modification and variations of these and other effects. All references in this specification to modifying, changing, lowering, reducing or eliminating the barrier include means by which the Coulomb barrier is offset by, or its effect is reduced by, the presence of one or more other features (e.g., high electron densities) even though the Coulomb barrier itself (independent of such features) remains unchanged.

It is noted that there is no requirement to provide or address the theory underlying the novel and groundbreaking fusion methods, devices and systems that are the subject of the present inventions. Nevertheless, these theories are provided to further advance the art in this important area. The theories put forth in this specification, unless expressly stated otherwise, in no way limit, restrict or narrow the scope of protection to be afforded the claimed inventions. These theories many not be required or practiced to utilize the present inventions. It is further understood that the present inventions may lead to new, and heretofore unknown theories to explain the fusion methods, devices and system of the present inventions, and such later developed theories shall not serve to diminish or limit the scope of protection afforded the claimed inventions.

Modification or Change of the Coulomb Barrier

Figure 5A:
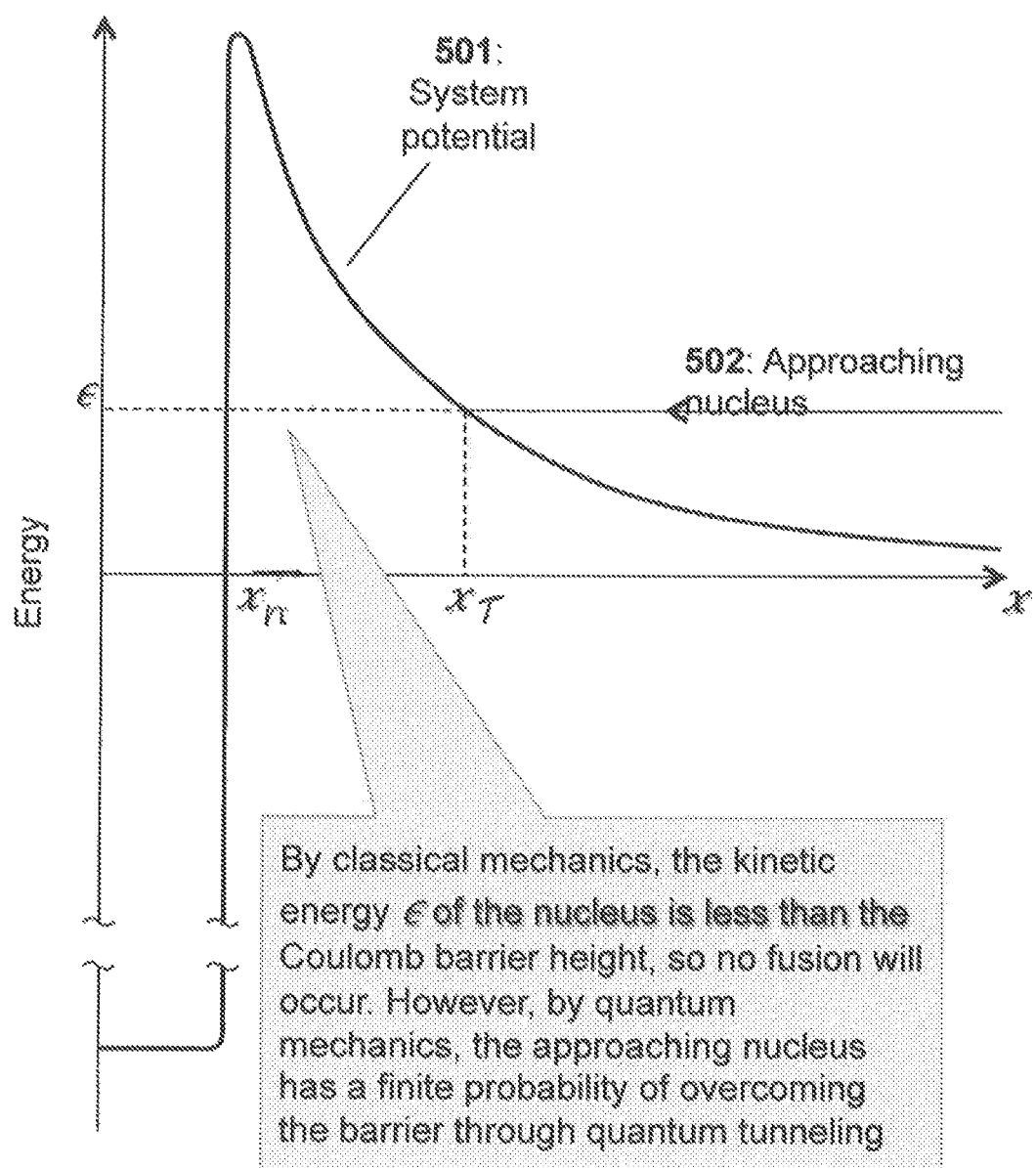
FIGS. 5A-5C show the potential energy curve of a two particle system in which a first nucleus is approaching a second nucleus in accordance with the present inventions.

In order to fuse, two nuclei must come into contact; however, nuclei are very small (on the order of $10^{-15}$ m), and because they are positively charged, they are electrostatically repulsed by one another. The potential energy curve of a two particle system 501 in which a first nucleus 502 is approaching a second nucleus is illustrated in FIG. 5A. On the horizontal axis, x is the distance between the two nuclei. The system potential 501 is near zero when the first nucleus is located far away from the second nucleus, and increases as the first nucleus approaches the second nucleus. The system potential 501 is the sum of the repulsive (positive) Coulomb potential and the attractive (negative) strong nuclear force potential. Once the two nuclei are very close, at distance $x_n$ apart (where $x_n$ is approximately equal to the sum of the radii of the two fusing nuclei), the system potential 501 becomes negative due to the effect of the strong nuclear force. Thus, the term "Coulomb barrier" is used to describe the difficulty of bringing the two nuclei into contact, either by getting through or getting above the potential curve shown in FIG. 5A.

FIG. 5A labels the kinetic energy of the two-nucleus system, "$\epsilon$," as expressed by:

$$\epsilon = \frac{1}{2} m_r v^2$$

where $v = v_1 - v_2$, $v_1$ and $v_2$ are the velocities of the two nuclei, and $m_r$ is the reduced mass of the system, given by:

$$m_r = \frac{m_1 m_2}{m_1 + m_2}$$

where $m_1$ and $m_2$ are the masses of the two nuclei. Classical mechanics holds that, when the nuclei are approaching one another, $\epsilon$ must be greater than the height of the Coulomb barrier for the nuclei to come into contact. However, quantum mechanics allows for "tunneling" through a potential barrier, thus making fusion reactions possible when $\epsilon$ is below this threshold. However, the magnitude of the barrier still presents an impediment to tunneling, such that reactions with larger Coulomb barriers (e.g., higher, wider, or both) are generally less likely to occur than those with smaller barriers.

Figure 5B:
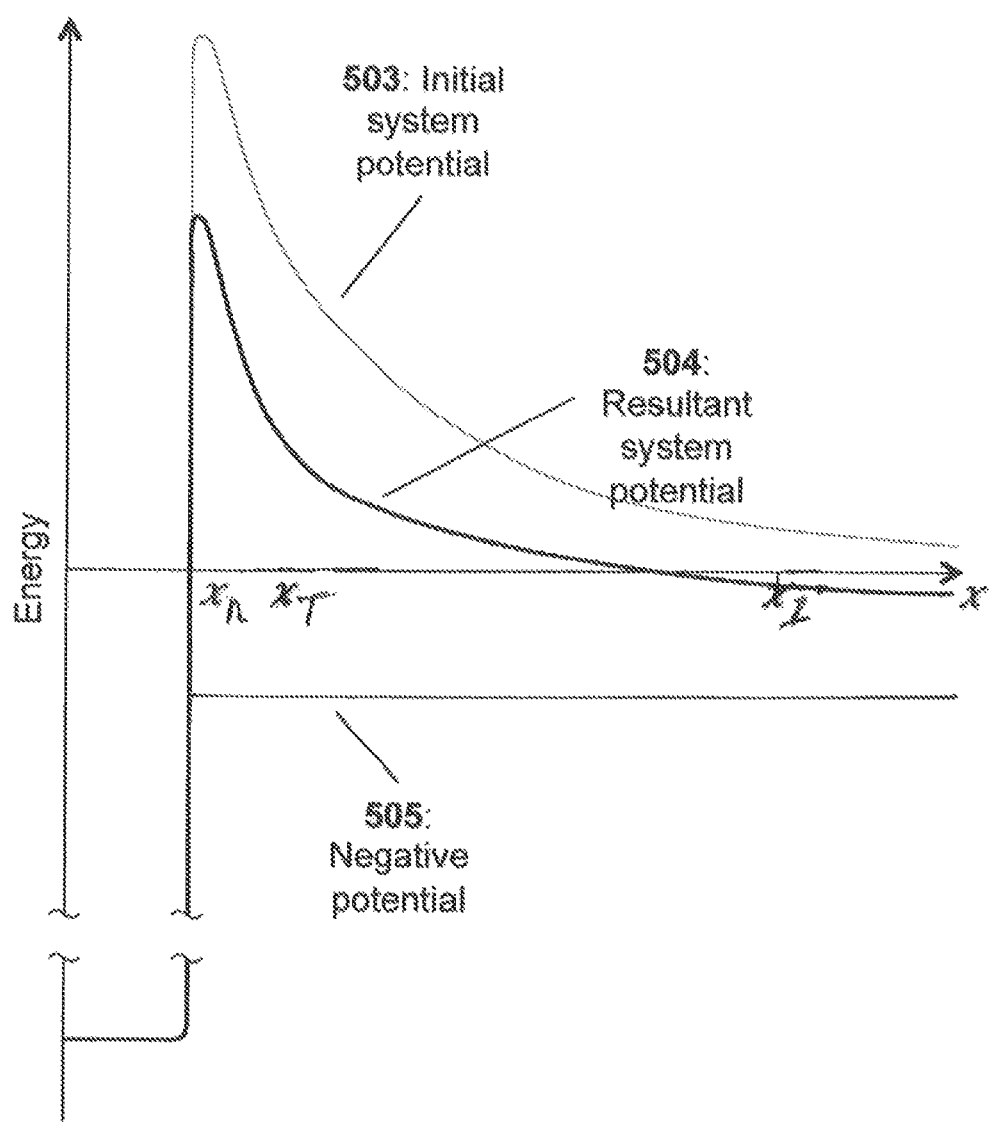

Embodiments of the present invention may lower or reduce the Coulomb barrier, and may eliminate it to the extent of creating a well, by creating, modifying, or utilizing effects that have negative (attractive) potentials. Such a negative potential is illustrated in FIG. 5B. In this figure, a negative potential 505 is shown, and the additive effect of the negative potential 505 and the initial system potential 503 creates a new, resultant system potential 504, in which the Coulomb barrier is lower.

Figure 5C:
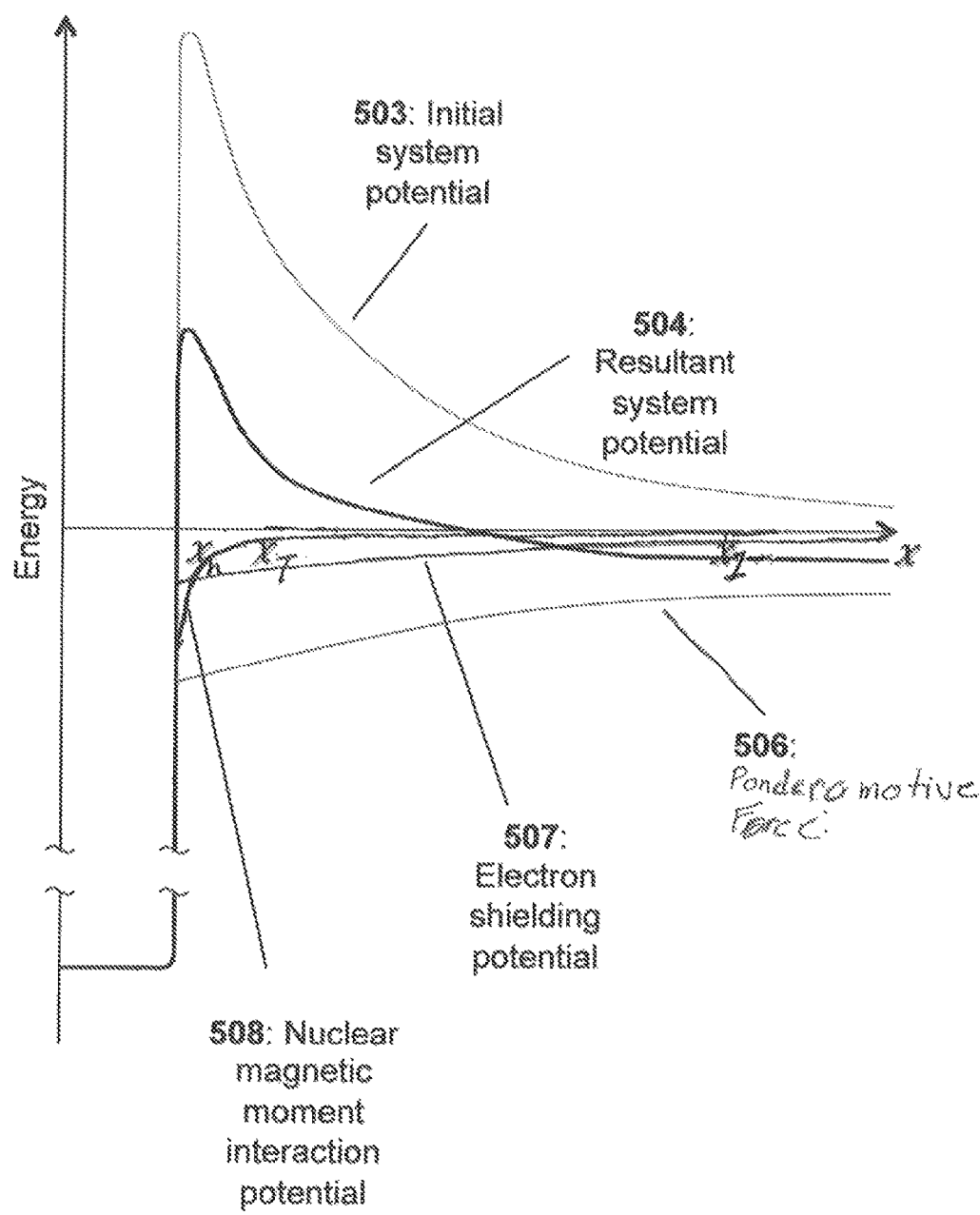

Thus, for example, embodiments of the present invention may lower or reduce the Coulomb barrier through the use of effects such as: space charge or electron shielding effects; large E-fields, high electron densities, the use of neutrals; ion-neutral coupling; or nuclear magnetic moment interaction, spin polarization, or dipole-dipole interaction effects; and combinations and variations of these and other effects. FIG. 5C illustrates the resultant system potential 504 that arises from combining the initial system potential 503 with ponderomotive force 506, an electron shielding potential, e.g., the high density electrons and large E-field 507, and a nuclear magnetic moment interaction potential 508. Each of these alone and in combination reduces the Coulomb barrier, which makes it easier for the nuclei to tunnel through or overcome the potential barrier, thus increasing the probability that the fusion reaction will take place.

Ponderomotive Force

In general, a ponderomotive force is a force that is created from an oscillating electric field. The ponderomotive force affects both positive and negative charged particles the same, i.e., moving them in the same direction. Thus, the ponderomotive force is a rare case where the sign of the particle charge does not change the direction of the force, unlike the case with the Lorentz force. Thus, in embodiments of the present invention the ponderomotive force has the effect of crushing, or compacting the substructure containing the fusion fuel forcing the fusion fuel into contact and to fuse. The ponderomotive force $F_p$ is expressed by $$Fp = \frac{e^2 \nabla E^2}{4m\omega^2}$$

where e is the electrical charge of the particle, m is the mass, ω is the angular frequency of oscillation of the field, and E is the amplitude of the electric field.

From this equation it is readily seen that the high E results in a strong ponderomotive force. However if the E field is at a high frequency, such as above the ion plasma frequency, then only the light electrons will be influenced by these fields. The heavier ions will nonetheless be influenced by the electron motion through the ambipolar electric field, which is the DC field generated when electrons are separated from the ions.

Electron Shielding

An advantage of using weakly ionized plasma is that the reactants largely comprise neutral atoms. The electrons interposed between the nuclei shield the repulsive Coulomb force between the positively charged nuclei. This phenomenon affects the Coulomb repulsion and may reduce the Coulomb barrier. In addition, using reactants that are highly efficient electron emitters introduces a cloud of electrons, a negative space charge, between the positively charged reactants, which further enhances this shielding effect. In an embodiment of the present invention, the high density electrons are driven by ponderomotive forces into the substructure, amongst the fusion fuel. It is believed that these electrons in the substructure provide an electron shielding effect which reduces the Coulomb barrier and enhances the fusion reaction rate. In a further embodiment, there is present in the system a material with a geometry or surface profile that creates non-uniform electric fields. Thus, by way of example, a surface with a dendritic profile may be desirable to generate very high localized electric fields for fusion.

Nuclear Magnetic Moment Interactions

Many nuclei have an intrinsic "spin," a form of angular momentum, which is associated with their own internal spinning motion and resultant current. The magnetic field lines form as though one end of the nucleus were a magnetic north pole, and the other end were a magnetic south pole, leading the nucleus to be referred to as a "magnetic dipole," and the strength and orientation of the dipole described as the "nuclear magnetic moment", which is represented as a vector.

Nuclear magnetic moments play a role in quantum tunneling. Specifically, when the magnetic moments of two nuclei are parallel, an attractive force between the two nuclei is created. As a result, the total potential barrier between two nuclei with parallel magnetic moments is lowered, and a tunneling event is more likely to occur. The reverse is true when two nuclei have antiparallel magnetic moments, the potential barrier is increased, and tunneling is less likely to occur.

When the magnetic moment of a particular type of nucleus is positive, the nucleus tends to align its magnetic moment in the direction of an applied magnetic field. Conversely, when the moment is negative, the nucleus tends to align antiparallel to an applied field. Most nuclei, including most nuclei which are of interest as potential reactants, have positive magnetic moments (p, D, T, $^6$Li, $^7$Li, and $^{11}$B all have positive moments; $^3$He, and $^{15}$N have negative moments). In an embodiment of a controlled fusion device a magnetic field may be provided that aligns the magnetic moments in approximately the same direction at every point within the device where a magnetic field is present. This results in a reduction of the total potential energy barrier between nuclei when the first and second working materials have nuclear magnetic moments which are either both positive or both negative. It is believed that this leads to an increased rate of tunneling and a greater occurrence of fusion reactions. This effect may also be referred to as spin polarization or magnetic dipole-dipole interaction. In addition, the gyration of a nucleus about a magnetic field line also contributes to determining the total angular momentum of the nucleus.

Hyperpolarization of Nuclei. Nuclei such as $^3$He can be polarized by collisions with alkali metal vapors or directly by RF fields in a weak magnetic field. This process can bring more than 90% of $^3$He atoms all aligned along the same direction, thereby increasing the attractiveness among them. The $^3$He $^3$He fusion reactions lead to the formation of 4He atom plus two energetic protons, a very desirable fusion reaction, because there are no neutrons in the product and the energy yield is very high, above 10 MeV.

Thus, although magnetic fields are not necessary with preferred embodiments of the present invention, e.g., "amagnetic"—a device free of additional, induced or provided magnetic fields, to obtain a controlled fusion reaction, they may be utilized to enhance, or optimize the fusion reaction and the performance of the device.

Modification or Change of the Reaction Cross Section

The probability of a fusion reaction between a pair of nuclei is expressed by the reaction cross section, "σ." The cross section is typically measured in experiments as a function of ϵ (energy) by bombarding a stationary target of nuclei with a beam of nuclei. The cross section is normally defined such that:

$$\sigma = \frac{B}{I}$$

where B is the number of reactions per unit time per target nucleus, and I is the number of incident particles per unit time per unit target area. When cross section is defined and measured in this way, each fusion reaction will have a certain, specific cross section at a particular ϵ for a given system.

The fusion reaction rate per unit volume in a particular reactor is normally described by:

$$R = \frac{n_1 n_2}{1 + \delta_{12}} \langle \sigma v \rangle$$

where $\delta_{12}=1$ if the first nucleus and the second nucleus are the same type of nuclei (e.g., ) deuterium is being fused with deuterium) and $\delta_{12}=0$ otherwise, and $\langle \sigma v \rangle$ is the "averaged reactivity" of the system, defined as:

$$\langle \sigma v \rangle = \int_0^\infty \sigma(v) v f(v) dv$$

where $f(v)$ is the distribution function of the relative velocities, normalized in such a way that $\int_0^\infty f(v)dv=1$. When the second nucleus is at rest, $\langle\sigma v\rangle=\sigma v$; however, the preceding definition accounts for situations in which the second nucleus moves, and each pair of interacting nuclei may have a different relative velocity v.

The rate of fusion energy release is then given by:

$$\frac{dW}{dt} = RE$$

where W is the total fusion energy per unit volume released and E is the energy released by a single reaction (E=8.68 MeV in the case of p-$^{11}$B fusion).

The probability of the two nuclei coming into contact through a quantum tunneling event is described by the tunneling barrier transparency, "T," such that a higher value of T corresponds to greater likelihood of tunneling. Since tunneling is the primary mechanism by which fusion occurs, cross section is proportional to T ($\sigma \propto T$). T is approximated by:

$$T \approx e^{-\sqrt{\frac{\epsilon_G}{\epsilon}}}$$

where e is Euler's number, and $\epsilon_G$ is the modified energy of the Coulomb barrier. When the two nuclei are a distance $x \geq x_T$ apart, $\epsilon_G$ is described by:

$$\epsilon_G \propto \int_{x_n}^{x_T} q_1 \varphi(x) dx$$

where, $q_1$ is the charge of the first nucleus, $\varphi(x)$ is the potential expressed as a function of x, and $x_T$ is the classical turning point at which $\varphi(x_T)=\epsilon$.

As a result of these relationships, a higher value of $\varphi$ (e.g., larger Coulomb barrier) will tend to translate into higher $\epsilon_G$, which in turn will tend to lead to lower T, lower $\sigma$, lower R, and, when E>0, lower $$\frac{dW}{dt}$$

for any specific system. Thus, systems in which potential $\varphi$ is high will tend to experience fewer fusion events and lower fusion energy release rates, and systems in which potential $\varphi$ is low will tend to experience more fusion events and higher fusion energy release rates. As discussed above, reducing the Coulomb barrier is equivalent to reducing potential $\varphi$, and embodiments of the present invention may employ these techniques to generally increase the cross section, $\sigma$; this also increases the fusion reaction rate.

High Particle Density

An embodiment of the present invention, instead of creating a strongly ionized plasma to obtain a high particle density, loads the substructure with significantly more, e.g., high density of, particles than is believed to be obtainable by any plasma. As the particles are essentially held in a solid, or are a solid material, this approach does not give rise to plasma instabilities, and so particle density ($n_1$ and $n_2$) can be many orders of magnitude higher than with a strongly ionized plasma, and many orders of magnitude higher than obtainable with weakly ionized plasma where its neutral density is at least $10^{17}/cm^3$. In an embodiment of the present invention, particle density is throughout the entire volume of the device. Further, the compression induced by the centrifugal force leads to an increased density of particles in the region in which fusion events are expected to be concentrated, leading to densities of about $10^{18}/cm^3$ or higher in the region of the device where reactants are concentrated.

In addition, an embodiment of the present invention uses boron compounds in a solid form, which have a particle density on the order of $10^{23}/cm^3$. Thus, in the region where fusion reactions are thought to be concentrated, the present invention achieves particle densities in a physical container many orders of magnitude greater than other methods known in the art (for example, it is believed that Tokamak reactors have not achieved sustained particle densities greater than about $10^{14}/cm^3$).

An advantage of the present inventions is that they effectively suppress radiation losses due to electron bremsstrahlung. Conventional fusion reactors such as Tokamaks employ hot, highly ionized plasma. Electron-ion interaction, resulting in bremsstrahlung and cyclotron radiation, is a significant source of energy loss and is one of the reasons such systems have not been able to satisfy the Lawson criterion. However, the high-density, lightly ionized, and colder plasma employed in embodiments of the present inventions suppresses electron mobility and greatly reduces radiative losses.

Phase Transition of Hydrogen Under High Pressures

Hydrogen atoms under high pressure compression can become liquid or solid metals, depending on the compressional forces and their states of rotation. In either the liquid or solid states, the density is many orders of magnitude higher than that in the gaseous state. The total reaction rate will be correspondingly higher according to the product of the particle densities of the two reactants.

In addition, metallic hydrogen becomes highly conductive or even a superconductor with zero resistance. This increases the overall conductivity of the entire system, lowering the resistive loss and the input energy required. Thus, the overall efficiency of such a system is greater, making it easier to attain a large Q factor and the corresponding energy gain.

Positive Feedback

The present invention may generate particles during operation. In some cases these particles may provide benefit to the device's function. In embodiments utilizing ionized particles, the creation of ionizing radiation may further enhance additional fusion by increasing, modifying, maintaining, or improving the ionization or a working material or plasma.

The key feature of this new fusion concept depends on the screening effect of electrons around the neutrals. It is expected that the fusion process will release more electrons through heating or collisions with fusion products. These processes could cause larger electron density fluctuations, including Langmuir collapses [1, 12]. This type of positive feedback generates stronger screening effects and could create sustainable fusion process for energy production.

EXAMPLES

The following examples are provided to illustrate various embodiments of controlled submicron fusion methods, devices and systems of the present inventions. These examples are for illustrative purposes, and should not be viewed as, and do not otherwise limit, the scope of the present inventions.

Example 1

Figure 2:
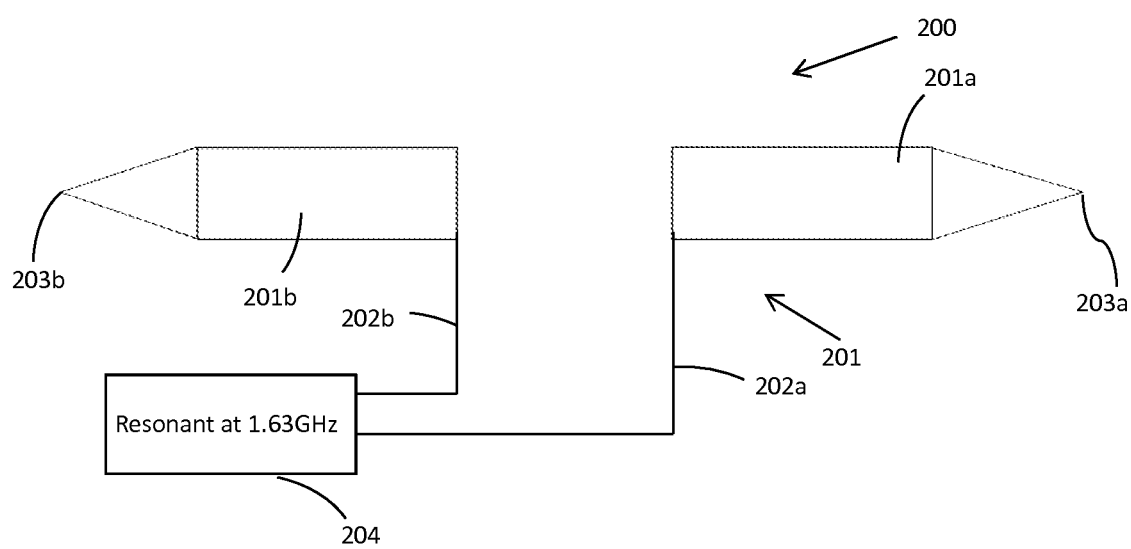
FIG. 2 is a schematic view of an embodiment of a controlled fusion device in accordance with the present inventions.

Turning to FIG. 2 there is shown a schematic of a submicron controlled fusion device 200. The device 200 has an electrode 201a, which is part of the base structure 201. The device 200 has a second electrode 201b, which is also part of the base structure 201. The electrodes 201a and 201b have substructures that contain the fusion fuel. The electrodes 201a, 201b, have tips 203a, 203b, which are discontinuities. Electrode 201a is connected to high density electron generator 204 by lead line 202a. Electrode 201b is connected to high density electron generator 204 by lead line 202b. The high density electron generator 204, in the embodiment of this example is an RF generator operating at 1.63 GHz. The dimensions for the device 200 are provided in the figure and are in inches.

Figure 3:
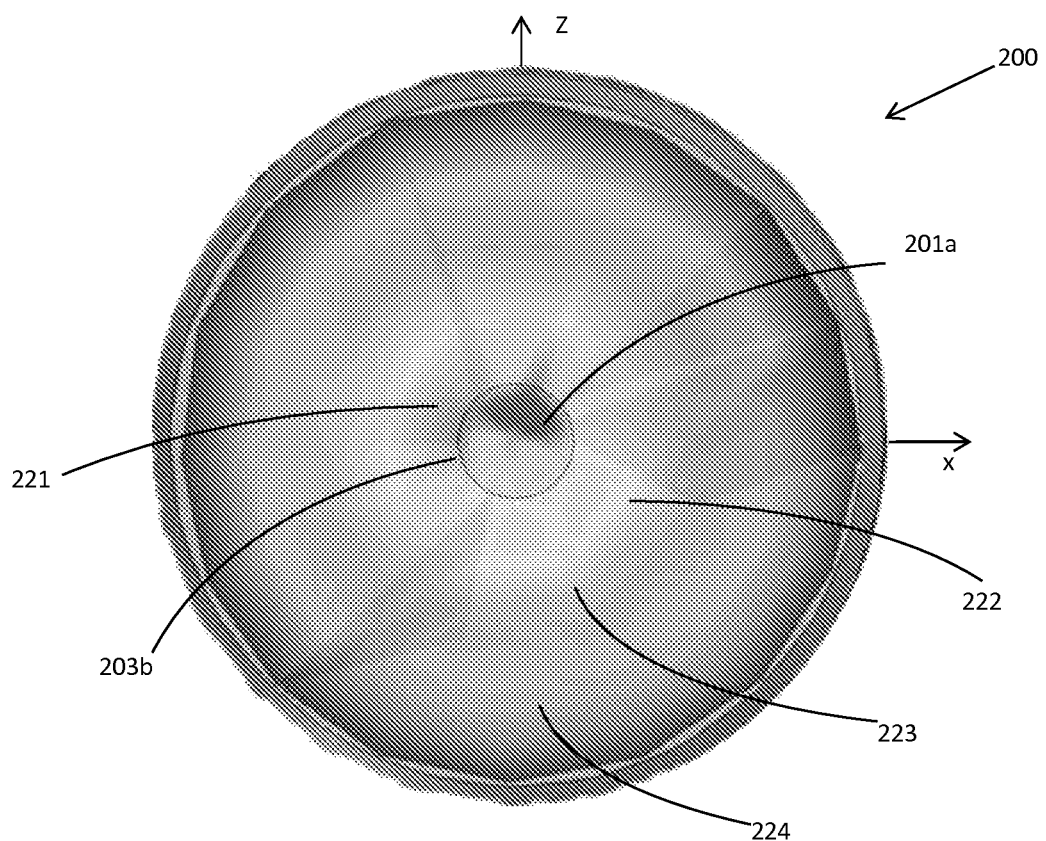
FIG. 3 is a graphic representation of an embodiment of a high density electron field of the embodiment of FIG. 2 in accordance with the present inventions.

Turning to FIG. 3 there is shown a schematic representation of the electron fields that will be generated by the device 200. FIG. 3 is a plan view, looking down the y-axis, of the tip 203b and electrode 201b. It being understood that a similar electron field will be generated by electrode 201a. The E fields generated are represented by the various color areas, area 220 is 3000 $\alpha$V/m, 221 is 2500 $\alpha$V/m, 222 is 2350 $\alpha$V/m, 223 is 1500 $\alpha$V/m, and 224 is 650 $\alpha$V/m where $\alpha$ is a proportional constant which depends on the generator voltage.

Example 2

The embodiment of example 1, has the electrodes made from palladium, and are coated with a thin layer of gold. The fusion fuel is a 50:50 mixture of hydrogen-1 and deuterium, and loaded to a particle density of $10^{22-}$/cc.

Example 3

The device of Example 2 has been operated in a cloud chamber to test the behavior of electrons. According to theory and past experiments the cloud chamber will show the emission of fusion product particles from the electrodes. The fusion products will include helium-3.

Example 4

A submicron controlled fusion device is associated with a detection chip that has been adapted to convert the fusion product particles into electricity.

Example 5

The electrical generation assembly of Example 4 powers a circuit in an electronic device. The electronic device can be a cell phone, a hearing aid, a pace maker, a glucose pump, an in situ diagnostic and metering system for the sensing of conditions, and delivery of medicaments. In embodiments, the device could be an independent unit with a primary function of providing electricity and/or heat to some other device (e,g., computers, cars, homes, etc.) including, by being connected to provide electricity and/or heat temporarily to one device (e.g., a car) and then disconnected from that device and connected to another device (e.g., a home). The development of such independent devices could also allow the rollout of electricity to lesser developed countries without the concurrent need to build transmission and distribution systems in the same way that lesser developed countries were able to build communications networks primarily by wireless means without having to build the wire infrastructure that the developed countries had built for communications prior to the development of wireless technologies.

Example 6

Figure 4:
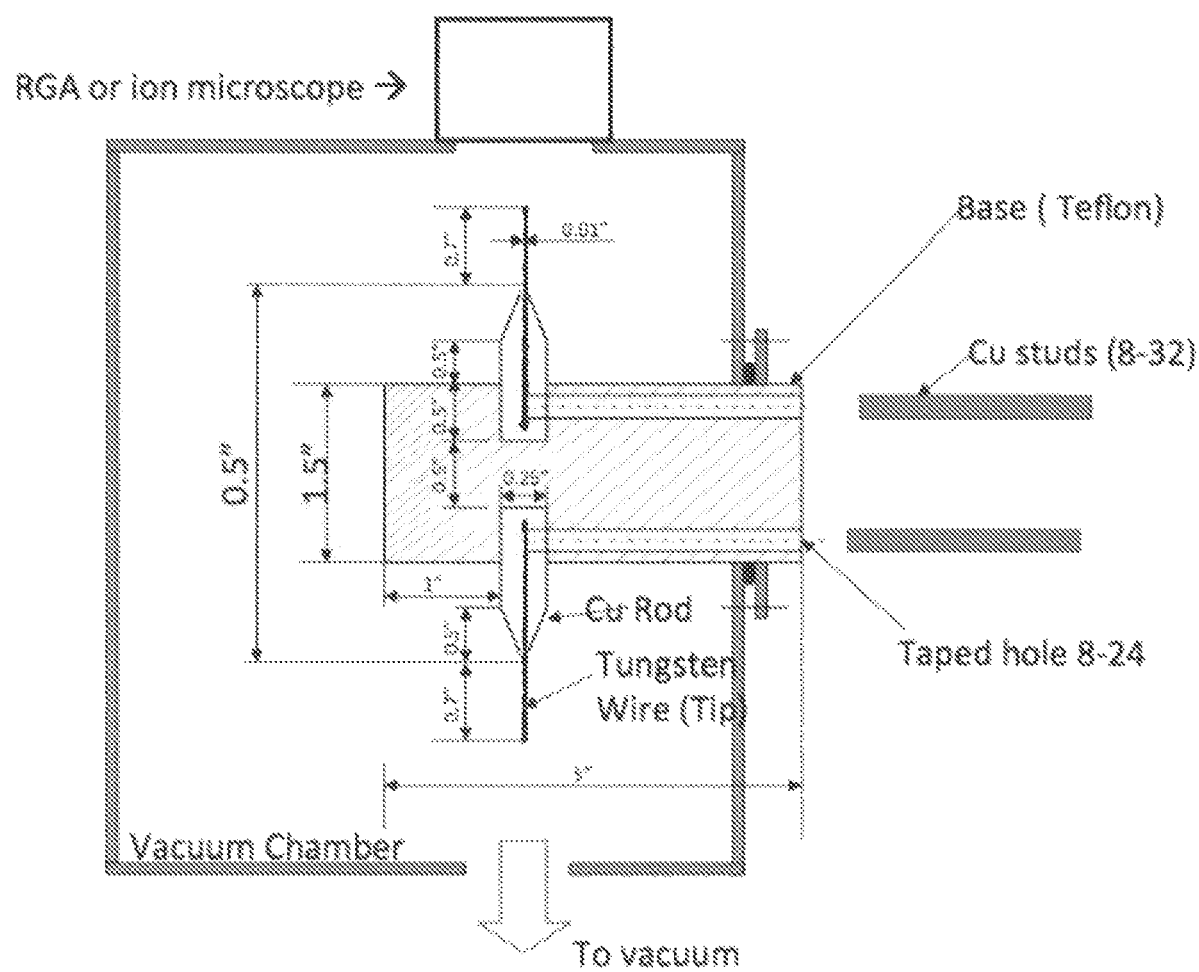
FIG. 4 is a schematic view of an embodiment of a controlled fusion device in accordance with the present inventions.

Turning to FIG. 4, there is shown a schematic diagram of a submicron fusion device of the present inventions in a vacuum chamber testing assembly.

Example 7

Figure 6:
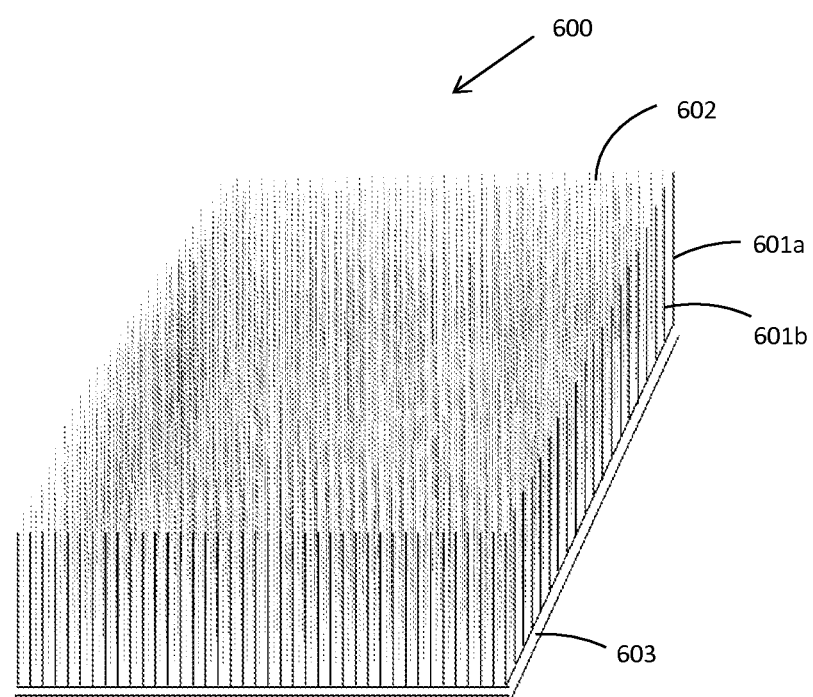
FIG. 6 is a perspective view of an embodiment of an array of controlled fusion devices in accordance with the present inventions.

Turning to FIG. 6, there is shown a perspective schematic view of an array 600 of several hundred substrates e.g., 601a, 601b that have been arranged on a planer support structure 603. The substrates each have a discontinuity, e.g., 602, which in this embodiment is a micro-point or tip. Each substrate, which in this embodiment is an electrode loaded with a fusion fuel, is subjected to a high electron density generator, which when activated drives the fusion reaction. The collective energy from the array can then be converted into electrical energy, or other forms of energy as may be required. The substrate in this embodiment can be Silica, Silicon carbide, or other suitable substrate.

Example 8

Estimate of Oscillating E Fields and the Associated Ponderomotive Force—and Effective Potential We assume a model of a dipole antenna driven by an oscillating source of peak voltage of $V_{osc}$=300V at a frequency of 2 GHz. During each cycle electrons are driven to the tapered tip of a dipole which has a radius of a=10 nm and a lateral area of A=0.1 u×0.1 u (where u is one micron). The oscillating electric field, $E_{osc}$, is given approximately by $V_{osc}$/a. This high frequency field acts only on electrons and gives rise to a ponderomotive force $F_e$ as a result of the gradient of the electric field intensity[7]

$$F_e = -\omega_{pe}^2/\omega^2 [\text{grad } \varepsilon_o E_{osc}^2/2] \text{ newtons/m}^3$$

Electrons undergoes a drift motion driven by this ponderomotive force $F_e$; the ambipolar electric field generated by the separation between electrons and ions transmit the same force to ions.

Example 9

Equivalent Potential $\Phi$ Experienced by Ions

The force experienced by an ion, $f_{ion}$, is obtained by dividing the above force, $F_e$, by the density of ions:

$$f_{ion} = -n_e/n_i n_f [\text{grad } \varepsilon_o E_{osc}^2/2] \text{ newtons, where}$$
$$n_f = \varepsilon_o \omega^2 m_e/e^2$$

For $n_e/n_i \sim 1, n_f = 4 \times 10^{16}/m^3$ $$f_{ion} \sim 8.8 \times 10^{-12} (300)^2 / 8 \times 10^{16} (10^{-8})^3 \sim 10 \text{ N}.$$

The equivalent potential felt by the ion is then $\Phi = f_{ion} x/q = 10^6$ volts, the distance x between two D atoms being taken to be $10^{-14}$ m where the repulsion barrier is greatest.

The equivalent potential is $10^6$ volts which is of the order of the Coulomb barrier, resulting in fusion through quantum tunneling.

Example 10

Consider nano-Au particles of 30 nm diameters.
Lasers of wavelengths corresponding to 2-4 eV energy are used to excite surface plasmons.
Laser was focused onto surface of nano-particles and excite Surface Plasmons.
Enhancement of near electric field was observed to be 100 from plasma resonance.

Example 11

Calculation of Energy Density of Enhanced Electric Fields Oscillating at Surface Plasma Resonance at Laser Frequencies Consider a pulsed 1 ns and 1 J laser focused to 50 nm: from balance of energy flow $c\varepsilon_o E^2_{osc} = P_o/A$ watt/m$^2$ $E^2_{osc} \sim 1.5 \times 10^{26}$ V$^2$/m$^2$ Taking the observed enhancement of E by $10^2$ via SP resonance $E^2_{osc} \sim 10^{30}$ V$^2$/m$^2$
Laser-excited $E^2$ is $10^9$ larger than previous electric dipole excitation at microwave frequencies. However the number density of ions is larger.
The laser excitation might be more efficient than microwave excitation. It can also be more easily implemented experimentally.

Example 12

Equivalent Potential Φ Experienced by Ions

The force experienced by an ion, $f_{ion}$, is obtained by dividing the ponderomotive force, $F_e$, by the density of ions:

$f_{ion} = -n_e/n_i n_f [\text{grad } \varepsilon_o E_{osc}^2/2]$ newtons, where
$n_f = \varepsilon_o \omega^2 m_e/e^2$ For $n_e/n_i \sim 1, n_f = 1.6 \times 10^{25}$/m$^3$, taking gradient length $\sim 10$ nm $f_{ion} \sim 8.8 \times 10^{-12} 10^{30}/3.2 \times 10^{25} 10^{-8} \sim 27$ N.

The equivalent potential felt by the ion is then $D = f_{ion} x/q = 2.7 \times 10^6$ volts, the distance x between two D atoms being taken to be $10^{-14}$ m where the repulsion barrier is greatest. The equivalent potential is $2.7 \times 10^6$ volts which is of the order of the Coulomb barrier, resulting in fusion through quantum tunneling.

Example 13

In an embodiment the fuel loaded into the base structure is a radioisotope. In this embodiment the decay of the radioisotope is regulated. In general, the Coulomb barrier acts as an impediment to the decay of radioisotopes. The mechanisms described in these embodiment could be deployed to reduce the Coulomb barrier so as to cause the decay of a radioisotope to occur at a faster rate than the natural "half-life" for such radioisotope.

The ability to increase the rate of decay of a radioisotope could be useful for the treatment of fission nuclear waste. One particularly favorable application would be to isolate and treat the most dangerous materials (whether elements or isotopes) with long half-lives so as to reduce such materials to stable (or at least less dangerous) elements or isotopes and to avoid having to construct storage mechanisms that need to be effective for very long periods (often many generations).

The ability to increase the rate of decay of a radioisotope could also be useful to create a device that would rely on the release of charged energetic particles for the production of electricity. By being able to increase the rate of decay of a radioisotope, the power output of the device could be materially increased without having to increase the amount of radioisotope that would need to be loaded into the device.

Example 14

In an embodiment a computer simulation program is used to simulate fusion reactions, determine the characteristic of such reactions, determine candidates for fusion reactions, simulate and model the events arising from utilization of the sub-micron and other fusion processes and devices disclosed herein and incorporated herein by reference. The computer simulation system has a computer, having a processor, a memory or storage and a human machine interface. The system has a program, data and both, associated with (e.g., the program, and the data, could be resident on the machine, on a server, in the cloud, etc.) it. Preferably the program has the following packages to provide calculations and present predictive data and information. These packages may be based upon actual data that is provided or stored in the system, from published data and from observed data. The program preferably has the following: a package for utilizing, modeling and both, high speed cylindrical rotation, and associated centrifugal forces; a package for utilizing, modeling and both, an array of electron emitters, which can be programmed to control the number of emitted electrons; a package for utilizing, modeling and both, fusion reactions and interactions, in the sub-atomic domain, including the collective behavior of electrons, ions and neutrals, the dynamics and interrelationship of the particles; a package for utilizing, modeling and both, diagnostics such as NMR, mass analyzers, chemical analyzers, and optical analyzers; a package for utilizing, modeling and both, electromagnetic radiations, basic interactions and controls for these radiations; a package for utilizing, modeling and both, energy production products to be (that are capable of, or their capability to be) transformed to electricity; a package for utilizing, modeling and both, heat energy and accounting for this energy and its management and utilization; and package for utilizing, modeling and both, the transformation between heat and electrical power, which would include thermoelectric effects.

The various embodiments of devices, methods and systems set forth in this specification may be used for various operations, other energy production, including the formation of materials. Additionally, these embodiments, for example, may be used with systems and operations that may be developed in the future; and with existing systems and operations that may be modified, in-part, based on the teachings of this specification. Further, the various embodiments set forth in this specification may be used with each other, in whole or in part, and in different and various combinations. Thus, for example, the configurations provided in the various embodiments of this specification may be used with each other; and the scope of protection afforded the present inventions should not be limited to a particular embodiment, configuration or arrangement that is set forth in a particular embodiment, example, or in an embodiment in a particular Figure.

The invention may be embodied in other forms than those specifically disclosed herein without departing from its spirit or essential characteristics. The described embodiments are to be considered in all respects only as illustrative and not restrictive.

What is claimed is:

1. A system for enhancing electron screening comprising:
an electrically conductive base structure, the base structure including light element atoms and containing free electrons; and
a source of electromagnetic (EM) radiation applied to the base structure, the EM radiation having an excitation frequency, wherein the base structure is configured such that:
in response to the EM radiation, the free electrons oscillate between at least two localized regions of the base structure; and
the oscillation generates periodic charge density variations around a portion of the light element atoms that are disposed in the at least two localized regions.

2. The system of claim 1, wherein the oscillation includes a plasmon oscillation.

3. The system of claim 1, wherein the source of EM radiation comprises one or more of a laser, a diode, an electron generator, a voltage generator, a microwave generator, a radio wave generator, or a magnetron.

4. The system of claim 1, wherein the excitation frequency is at least about 1 GHz.

5. The system of claim 1, wherein the base structure comprises a nanostructure.

6. The system of claim 1, wherein the source of EM radiation is configured to generate EM radiation having a wavelength of from about 10 microns to about 0.1 micron.

7. The system of claim 1, wherein the source of EM radiation is configured to generate EM radiation having X-ray or gamma ray wavelengths.

8. The system of claim 1, wherein at least a portion of the base structure includes at least one electrode having a tapering section and a tip, the tip being proximate to a discontinuity.

9. The system of claim 8, wherein the discontinuity is configured as a knife edge, an annular knife edge, disposed at the tip.

10. The system of claim 8, wherein the source of EM radiation is configured to operate at a power that is generally less than about 1 mW per discontinuity.

11. The system of claim 1, wherein at least a portion of the base structure comprises a discontinuity.

12. The system of claim 11, wherein at least a portion of the discontinuity comprises a shape that is at least partially generally circular, square, rectangular, elliptical, tubular, or pointed.

13. The system of claim 11, wherein at least a portion of the discontinuity comprises a nanostructure.

14. The system of claim 13, wherein the discontinuity is coated with a coating material to enhance or facilitate a flow of electrons along its surface.

15. The system of claim 14, wherein the coating material is a gold, copper, silver or other conducting material.

16. The system of claim 11, wherein the discontinuity has an area of about of about 10 nm$^2$ or less.

17. The system of claim 11, wherein the base structure comprises two or more discontinuities.

18. The system of claim 1, wherein at least a portion of the base structure comprises an array of discontinuities.

19. The system of claim 18, wherein the array of discontinuities is coupled to at least one substrate arranged on a support structure.

20. The system of claim 1, wherein at least a portion of the base structure is coated with a coating material to enhance or facilitate a flow of electrons along its surface.

21. The system of claim 20, wherein the coating material is a gold, copper, silver or other conducting material.

22. The system of claim 1, wherein the light element atoms have an atomic mass of 62 or less.

23. The system of claim 1, wherein at least a portion of the base structure is configured to exhibit a ratio of light element atoms to other atoms of at least 2 to 1.

24. The system of claim 1, wherein light element atoms include one or more of hydrogen-1, deuterium, boron-11, lithium-6, lithium-7, deuterium, tritium, helium-3, nitrogen-15 and tritium.

25. The system of claim 1, wherein at least a portion of the base structure comprises one or more of palladium, tungsten, boron hydride, titanium, tantalum.

26. The system of claim 1, wherein at least a portion of the base structure comprises one or more getter materials.

27. The system of claim 1, further comprising one or more antenna structures.

28. The system of claim 27, wherein said one or more antenna structures comprise a first structure and a second metal structure respectively located on opposite sides of said base structure.

29. The system of claim 1, wherein the source of EM radiation is configured to operate at a power between about 1 mW and 10 mW.

30. The system of claim 1, wherein electron screening substantially offsets or reduces the effect of the Coulomb barrier between nuclei of the light element atoms.

31. The system of claim 30, wherein the oscillating free electrons, create an electric field greater than about $10^8$ volts/meter at a location proximate to the two localized regions and provides localized compression by ponderomotive forces that induces a fusion reaction between nuclei of at least a portion of the light element atoms.

32. An apparatus for enhancing electron screening comprising:
an electrically conductive base structure, the base structure including light element atoms and free electrons;
the base structure being configured such that, when subjected to applied electromagnetic (EM) radiation, having an excitation frequency:
in response to the applied EM radiation, the free electrons oscillate between at least two localized regions of the base structure; and
the oscillation generates periodic charge density variations around a portion of the light element atoms that are disposed in the at least two localized regions.

33. The apparatus of claim 32, wherein the base structure comprises a nanostructure.

34. The apparatus of claim 32, wherein electron screening substantially offsets or reduces the effect of the Coulomb barrier between nuclei of the light element atoms.

35. The apparatus of claim 34, wherein the oscillating free electrons creates an electric field greater than about $10^8$ volts/meter at a location proximate to the two localized regions and provides localized compression by ponderomotive forces that induces a fusion reaction between nuclei of at least a portion of the light element atoms.

* * * * *